(12) United States Patent
Bastide et al.

(10) Patent No.: US 10,936,143 B2
(45) Date of Patent: *Mar. 2, 2021

(54) AUTOMATED RESIZING OF APPLICATION WINDOWS BASED ON INTERACTIVE STATES

(71) Applicant: International Business Machines Corporation, Armonk, NY (US)

(72) Inventors: Paul R. Bastide, Ashland, MA (US); Jana H. Jenkins, Raleigh, NC (US); Robert E. Loredo, North Miami Beach, FL (US); Fang Lu, Billerica, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/293,953

(22) Filed: Mar. 6, 2019

(65) Prior Publication Data
US 2019/0204993 A1 Jul. 4, 2019

Related U.S. Application Data

(63) Continuation of application No. 15/438,864, filed on Feb. 22, 2017, now Pat. No. 10,331,293.

(51) Int. Cl.
*G06F 3/048* (2013.01)
*G06F 3/0481* (2013.01)

(52) U.S. Cl.
CPC .. *G06F 3/0481* (2013.01); *G06F 2203/04803* (2013.01)

(58) Field of Classification Search
CPC .................................................... G06F 3/0481
(Continued)

(56) References Cited

U.S. PATENT DOCUMENTS

| 5,666,498 A | 9/1997 | Amro |
| 5,699,535 A | 12/1997 | Amro |

(Continued)

OTHER PUBLICATIONS

Anonymously; "A Method and System for Resizing of Windows on a Multi-Touch Device Using Gestures"; http://ip.com/IPCOM/000228066D; Jun. 4, 2013; 3 pages.
(Continued)

*Primary Examiner* — David Phantana-angkool
(74) *Attorney, Agent, or Firm* — Richard Wilhelm; Edell, Shapiro & Finnan, LLC (57) ABSTRACT

According to an embodiment of the present invention, a system dynamically resizes one or more application windows displayed on one or more screens based on an interactive state associated with the one or more application windows. Initially, a processor displays a plurality of different windows associated with one or more corresponding applications and determines an interactive state associated with each of the plurality of different windows. The processor then analyzes the interactive states of each of the plurality of different windows and, in response, adjusts a size of one or more of the plurality of different windows in accordance with the determined interactive states. Embodiments of the present invention further include a method and computer program product for dynamically resizing one or more application windows based on the interactive states associated with the one or more application windows in substantially the same manner described above.

20 Claims, 9 Drawing Sheets

(58) Field of Classification Search
USPC .................................................. 715/798
See application file for complete search history.

(56) References Cited

U.S. PATENT DOCUMENTS

| | | | |
|---|---|---|---|
| 5,751,283 | A | 5/1998 | Smith |
| 5,757,371 | A | 5/1998 | Oran |
| 5,990,889 | A | 11/1999 | Amro |
| 6,957,395 | B1 | 10/2005 | Jobs |
| 7,478,339 | B2 | 1/2009 | Pettiross et al. |
| 7,730,418 | B2 | 6/2010 | Wang et al. |
| 7,949,954 | B1 | 5/2011 | Jezek |
| 7,961,202 | B2 | 6/2011 | Conner |
| 3,040,360 | A1 | 10/2011 | Louch |
| 8,286,090 | B2 * | 10/2012 | Ballard ................ G06F 3/0481 715/781 |
| 8,464,177 | B2 | 6/2013 | Ben-Yoseph |
| 8,910,066 | B2 | 12/2014 | Zotov et al. |
| 9,239,667 | B2 * | 1/2016 | Matthews ............ G06F 3/0481 |
| 9,250,761 | B2 * | 2/2016 | Vranjes .............. G06F 3/04847 |
| 9,710,140 | B2 * | 7/2017 | Moreau ................ H04L 67/10 |
| 9,798,713 | B2 * | 10/2017 | Zhu .................... G06F 3/04842 |
| 10,061,598 | B2 * | 8/2018 | Balasubramanian ................ G06F 3/04892 |
| 10,152,190 | B2 * | 12/2018 | Jones .................. G06F 3/0481 |
| 10,579,250 | B2 * | 3/2020 | Leonard .............. G06F 3/0488 |
| 10,592,080 | B2 * | 3/2020 | Vranjes .............. G06F 3/04842 |
| 10,678,412 | B2 * | 6/2020 | Vranjes ................ G06F 3/0481 |
| 10,768,803 | B2 * | 9/2020 | Van Der Zaag ........ G06F 9/451 |
| 2011/0009188 | A1 * | 1/2011 | Adiraju ................ G07F 17/323 463/25 |
| 2012/0115122 | A1 | 5/2012 | Bruce |
| 2012/0304106 | A1 * | 11/2012 | LeVee .................. G06F 3/0485 715/781 |
| 2013/0067412 | A1 * | 3/2013 | Leonard .............. G06F 3/04817 715/835 |
| 2013/0080970 | A1 * | 3/2013 | Sirpal .................. G06F 1/1677 715/790 |
| 2014/0282232 | A1 * | 9/2014 | Oh ........................ G06F 3/0488 715/800 |
| 2014/0337794 | A1 * | 11/2014 | Vranjes ................ G06F 3/0481 715/800 |
| 2015/0186024 | A1 * | 7/2015 | Hong .................. G06F 3/04886 715/800 |
| 2016/0034159 | A1 * | 2/2016 | Vranjes .............. G06F 3/04812 715/800 |
| 2016/0349974 | A1 * | 12/2016 | Louch ................ G06F 3/04847 |
| 2017/0168769 | A1 * | 6/2017 | Jeon .................... H04M 1/0268 |
| 2018/0107440 | A1 * | 4/2018 | Knoppert ............ G06F 3/0481 |
| 2018/0239521 | A1 * | 8/2018 | Bastide ................ G06F 3/0481 |
| 2019/0056857 | A1 * | 2/2019 | Mamaril .............. G06F 3/0488 |
| 2020/0225809 | A1 * | 7/2020 | Jones ...................... H04N 7/15 |

OTHER PUBLICATIONS

Anonymously; "Method and process for autonomically organizing and sizing windows based on previous patterns of application window arrangement and organization"; http://ip.com/IPCOM/000212215D; Nov. 4, 2011; 7 pages.

Microsoft et al.; "Invoking window size based on UI visual layouts via behaviors in WinRT UI applications"; http://ip.com/IPCOM/000234850D; Feb. 11, 2014; 5 pages.

List of IBM Patents or Patent Applications Treated as Related, Mar. 2019, 1 page.

* cited by examiner

AUTOMATED RESIZING OF APPLICATION WINDOWS BASED ON INTERACTIVE STATES

CROSS-REFERENCE TO RELATED APPLICATIONS

This application is a continuation of U.S. patent application Ser. No. 15/438,864, entitled "AUTOMATED RESIZING OF APPLICATION WINDOWS BASED ON INTERACTIVE STATES" and filed Feb. 22, 2017, the disclosure of which is incorporated herein by reference in its entirety.

BACKGROUND

1. Technical Field

Present invention embodiments relate to automated resizing of application windows, and more specifically, to dynamic application window resizing based on the interactive states of the application windows being resized.

2. Discussion of the Related Art

As the use of computers in both the workforce and personal life has increased, the number of application programs and corresponding windows that users employ has similarly increased. For example, users typically associate an application window with a task, such as email, and often create mental associations between multiple application windows and a single task or project. As a result, multiple application windows may be simultaneously visible on a screen and each application window may be associated with one or more tasks. However, the simultaneous display of multiple windows related to application programs frequently results in application windows overlapping and obscuring each other. This makes it difficult for a user to locate or navigate to a specific application window, forcing the user to frequently navigate between the different application windows. As a result, application windows of interest to the user often get buried or marginalized by less important application windows that are more visible to the user.

Consequently, it is often difficult for a user to juggle between different windows to get the application sized the right way so the user can see the necessary content clearly when different applications are open on the user display. This type of situation frequently occurs in different user scenarios: e.g., one monitor, multiple monitors, application windows that have sub-windows in them, etc. It is, however, troublesome for a user to repeatedly manually resize application windows. Furthermore, although some users use multiple monitors at the same time, they may still need to juggle application windows to resize the application windows manually to be able to view and interact with the individual application windows.

SUMMARY

According to an embodiment of the present invention, a system dynamically resizes one or more application windows displayed on one or more screens based on an interactive state associated with the one or more application windows. Initially, a processor displays a plurality of different windows associated with one or more corresponding applications and determines an interactive state associated with each of the plurality of different windows. The processor then analyzes the interactive states of each of the plurality of different windows and, in response, adjusts a size of one or more of the plurality of different windows in accordance with the determined interactive states. Embodiments of the present invention further include a method and computer program product for dynamically resizing one or more application windows based on the interactive states associated with the one or more application windows in substantially the same manner described above.

DETAILED DESCRIPTION

Present invention embodiments dynamically resize one or more application windows based on an interactive state associated with each of the one or more application windows. Initially, a user device requests one or more applications from one or more servers and displays the one or more applications in one or more application windows on the user device. A processor in the user device may then determine the interactive state for each of the one or more application windows displayed on the user device based on user interest and/or activity within each of the one or more application windows. After determining the interactive state associated with each of the one or more application windows, the processor may identify one or more application windows as being active and, in response, gradually enlarge the size of the one or more active windows to facilitate user interaction with the windows. Similarly, the processor may identify one or more application windows as being inactive and, in response, gradually reduce the size of the one or more inactive windows to minimize user distraction and to more efficiently use the limited space of the user display. Embodiments of the present invention further include a method and computer program product for automatically resizing one or more application windows in substantially the same manner as described above.

The analysis techniques may further identify one or more application windows that are correlated with one or more active application windows and, in response, gradually increase the size of the correlated application windows based on the strength of their correlation with the one or more active application windows. For example, a processor may identify an area of user interest and/or focus within a primary application window and determine a context associated with the area of user interest and/or focus within the primary application window. The processor may further determine a context and a correlation ranking and/or score associated with each of the remaining application windows displayed on one or more user screens such that the correlation ranking and/or score indicates the strength of the correlation between the context associated with the area of user interest and/or focus and that for each application window displayed on the one or more user screens. In response, the processor may gradually increase the size of one or more application windows having a correlation rank and/or score above a pre-configured threshold level, and reduce the size of one or more application windows having a correlation rank and/or score below the pre-configured threshold level.

In general, present invention embodiments determine an interactive state, e.g., a user activity and/or focus of interest, associated with one or more application windows displayed on a user device and dynamically adjust, i.e., increase or decrease, the size of the one or more application windows based on each of the interactive states associated with the one or more application windows. For example, one or more active application windows may be identified based on recent user activity and/or interest and may be automatically enlarged by a predetermined percentage or to a pre-configured maximum size. The disclosed embodiments may therefore facilitate user interactions with one or more application windows that are of interest to a user, making it easier for users to concentrate on, and interact with, the application windows that are most relevant to them.

Figure 1:
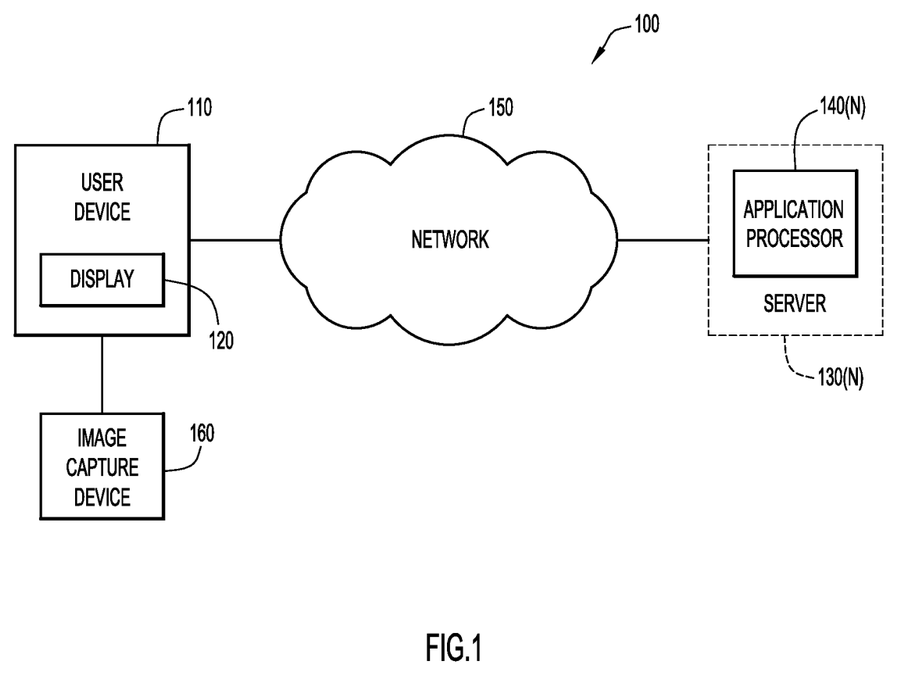
FIG. 1 is a diagrammatic illustration of an example computing environment for use with an embodiment of the present invention.

An example computing environment for use with present invention embodiments is illustrated in FIG. 1. Specifically, environment 100 includes a user device 110 and one or more servers 130. User device 110 may comprise one or more displays 120, and server 130 may comprise one or more application processors 140, which are responsible for running one or more applications on server 130 and for providing an interface between user device 110 and the one or more applications. Optionally, user device 110 may be in communication with image capture device 160, which may be used to track, e.g., through pupil movements, one or more areas of user interest and/or focus on one or more displays 120. Server 130 and user device 110 may be remote from each other and communicate over a network 150. Network 150 may be implemented by any number of any suitable communications media (e.g., wide area network (WAN), local area network (LAN), Internet, Intranet, etc.). Alternatively, server 130 and user device 110 may be local to each other, and communicate via any appropriate local communication medium (e.g., local area network (LAN), hardwire, wireless link, Intranet, etc.).

User device 110 enables users to request and receive application data and/or images associated with one or more applications and to interact with the one or more applications through one or more application windows displayed on one or more displays 120. For example, a user associated with user device 110 may request access to an application from application server 130 and, in response, receive application data and/or images from server 130 that may be displayed in an application window rendered on display 120, thereby enabling the user to interact with the requested application. According to a present invention embodiment, user device 110 may automatically adjust the size of an application window based on the current level of user activity and/or or interest within the application window.

Initially, user device 110 determines an interactive state associated with one or more application windows rendered on display 120 based on a current level of user activity and/or interest within the one or more application windows. After determining the interactive state associated with each of the one or more application windows, user device 110 may adjust the size of one or more application windows based on the interactive state associated with the one or more application windows. For example, user device 110 may increase the size of one or more application windows determined to be active for longer than a predetermined threshold period of time and, similarly, may decrease the size of one or more application windows determined to be inactive for longer than a predetermined threshold period of time.

User device 110 may further identify an area of user interest and/or focus within a segment of a primary application window and/or display 120 and, based on a context associated with the area of user interest and/or focus, determine whether one or more application windows displayed on display 120 are related to the area of user interest and/or focus. According to a present invention embodiment, user device 110 may identify an area of user interest and/or focus within a segment of a primary application window and/or display 120 based on one or more pupil movements received from image capture device 160.

To determine whether to increase or decrease the size of the one or more application windows displayed on display 120, user device 110 may further determine a context and a correlation rank and/or score of the one or more application windows indicating the correlation between the context associated with the area of user interest and/or focus and the context associated with the one or more application windows rendered on display 120. For example, to facilitate user interaction with both an active window and one or more windows related to the active window, user device 110 may gradually increase the size of one or more application windows having a correlation rank and/or score above a pre-configured threshold level. Similarly, to reduce user confusion and to more efficiently use valuable screen space on display 120, user device 110 may gradually reduce the size of one or more application windows having a correlation rank and/or score below the pre-configured threshold level.

Figure 2:
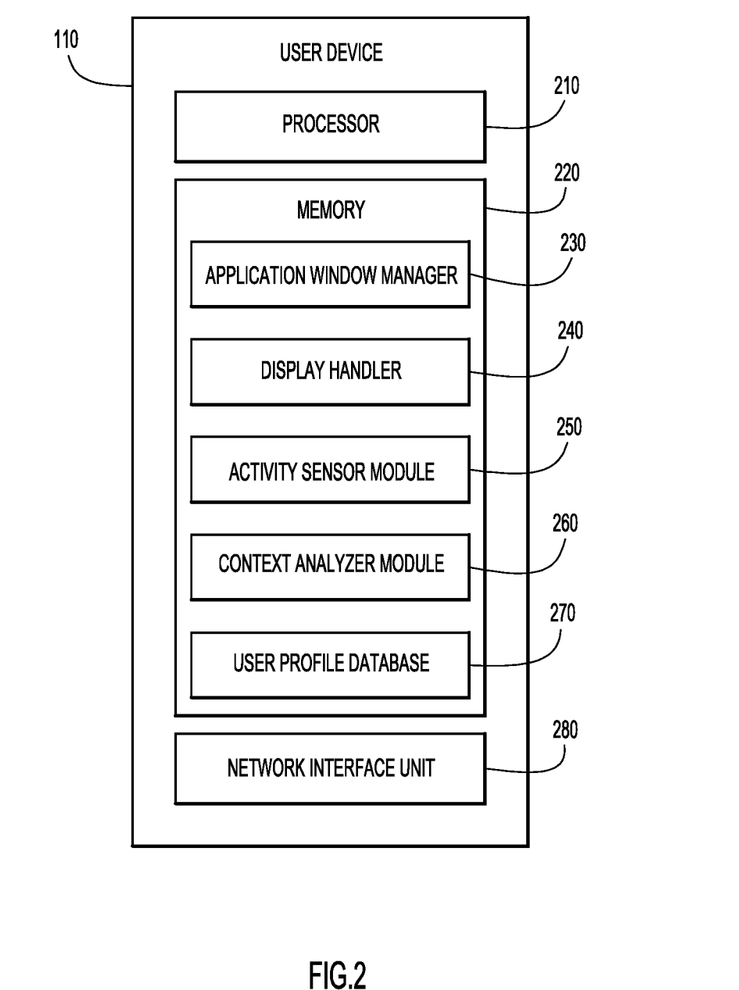
FIG. 2 is a block diagram illustrating the user device of FIG. 1 in more detail according to an embodiment of the present invention.

Reference is now made to FIG. 2, which shows an example block diagram of a user device 110 configured to dynamically resize one or more application windows according to present invention embodiments. It should be understood that there are numerous possible configurations for user device 110 and FIG. 2 is meant to be an example of one of the possible configurations. User device 110 includes a processor 210, memory 220 and a network interface unit 280. The network interface (I/F) unit (NIU) 280 is, for example, an Ethernet card or other interface device that allows user device 110 to communicate over communication network 150. Network I/F unit 280 may include wired and/or wireless connection capabilities.

Processor 210 may include a collection of microcontrollers and/or microprocessors, for example, each configured to execute respective software instructions stored in the memory 220. Memory 220 may include various modules for execution by processor 210, including application window manager 230, display handler 240, activity sensor module 250, context analyzer module 260, and user profile database 270. Portions of memory 220 (and the instructions or modules therein) may be integrated with processor 210.

Memory 220 may comprise read only memory (ROM), random access memory (RAM), magnetic disk storage media devices, optical storage media devices, flash memory devices, electrical, optical, or other physical/tangible (e.g., non-transitory) memory storage devices. Thus, in general, memory 220 may comprise one or more computer readable storage media (e.g., a memory device) encoded with software comprising computer executable instructions and when the software is executed (e.g., by processor 210) it is operable to perform the operations described herein. For example, memory 220 stores or is encoded with instructions for application window manager 230 to perform overall control of the dynamic resizing of one or more application windows described herein by receiving one or more inputs from multiple components, including display handler 240, activity sensor module 250, context analyzer module 260 and user profile database 270. Application window manager 230 is further configured to determine, based on the received parameters and/or preferences, whether to resize one or more application windows rendered on one or more displays 120 associated with user device 110.

Display handler 240 is configured to render, on one or more displays 120 associated with user device 110, one or more application windows associated with one or more corresponding applications received from one or more servers 130. Accordingly, display handler 240 is configured to simultaneously display the one or more application windows on one or more displays 120. For example, display handler 240 may tile one or more application windows on display 120 and/or simultaneously display the one or more application windows adjacent to each other on display 120. According to a present invention embodiment, display handler 240 may initially size the one or more application windows for display on user device 110 according to a default configuration value. Display handler 240 may also determine the number of displays 120 on which user device 110 is configured to display one or more application windows. It should be understood that display handler may use any output device and/or graphical user interface (GUI) to display one or more application windows on user device 110.

Activity sensor module 250 is configured to detect and/or identify one or more areas of user focus and/or interest in one or more application windows and/or segments of display 120. Accordingly, activity sensor module 250 may determine an interactive state associated with one or more application windows based on a user's area of focus and/or interest on display 120. For example, activity sensor module 250 may determine an active area of user interest and/or focus within an application window based on the number of user clicks within a segment of the application window or by monitoring user eye moments, e.g., via image capture device 160, with respect to display 120.

Context analyzer 240 may use Natural Language Processing (NLP) techniques to parse one or more application windows and/or segments of display 120 to determine the contextual meaning associated with the one or more application windows and/or segments of display 120. For example, if an application window contains a heading "Welcome to Meetings," context analyzer 240 may determine that the application window is associated with an ongoing web conference and/or chatroom in which a user associated with user device 110 is participating. Similarly, context analyzer may further may use NLP techniques to parse one or more remaining application windows on display 120 to determine whether any of the remaining windows are associated or correlated with the chatroom in which the user is participating.

Application window manager 230, display handler 240, activity sensor module 250 and context analyzer module 260 may include one or more modules or units to perform the various functions of present invention embodiments described below. The various modules (e.g., application window manager, display handler, activity sensor module, context analyzer module, etc.) may be implemented by any combination of any quantity of software and/or hardware modules or units, and may reside within memory 220 of user device 110 for execution by processor 210.

Memory 220 may further provide user profile database 270, which stores various information used and generated by application window manager 230 for resizing one or more application windows corresponding to one or more applications provided by server 130 displayed on user device 110. For example, user profile database 270 may store one or more preferences associated with a user (e.g., preferred window size, security preferences, etc.), and/or one or more display parameters associated with device 110 (e.g., number of display screens, size of the display screens, etc.). User profile database 270 may be implemented by any conventional or other database or storage unit, may be local to or remote from user device 110, and may communicate via any appropriate communication medium (e.g., local area network (LAN), wide area network (WAN), Internet, hardwire, wireless link, Intranet, etc.).

Figure 3:
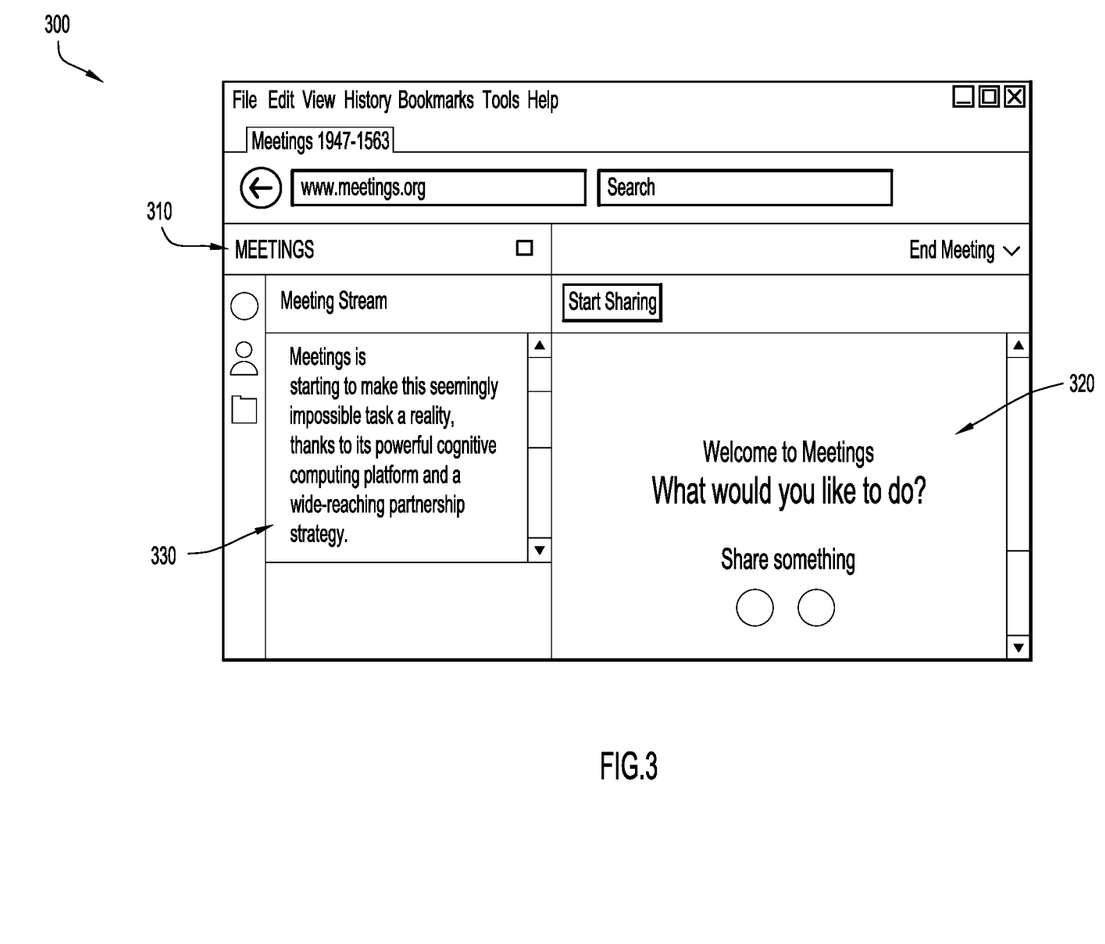
FIG. 3 is a schematic illustration of an example graphical user interface with multiple windows simultaneously displayed within an active chat room.

A diagrammatic illustration of an application window 300 displayed on user device 110 according to an embodiment of the present invention is illustrated in FIG. 3. By way of example, application window 300 may include an application name 310, a main room area 320 and a chat room area 330. For example, application name 310 may identify a "meetings" application as corresponding to application window 300. As shown in FIG. 3, main room area 320 may be initially configured with a welcome message directed to a user when the "meetings" application is invoked. Chat room area 330 may further contain a real-time message stream of an ongoing meeting in which a user associated with user device 110 is interactively participating. Initially, user device 110 may generate application window 300 such that main room area 320 is initially populated with a pre-configured static greeting and the size of main room area 320 and chat room area 330 are set in accordance with pre-configured parameters. For example, as further shown in FIG. 3, the size of main room area 320 initially may be significantly larger than that of chat room area 330. Chat room area 330, however, contains text streams that may represent a real-time dialogue associated with an ongoing, interactive meeting in which the user is participating. Accordingly, as shown in FIG. 3, chat room area 330 may therefore include contextual information that is not shown in application window 330, forcing the user to scroll down in chat room area 330 to interactively participate in the real-time meeting.

Figure 4:
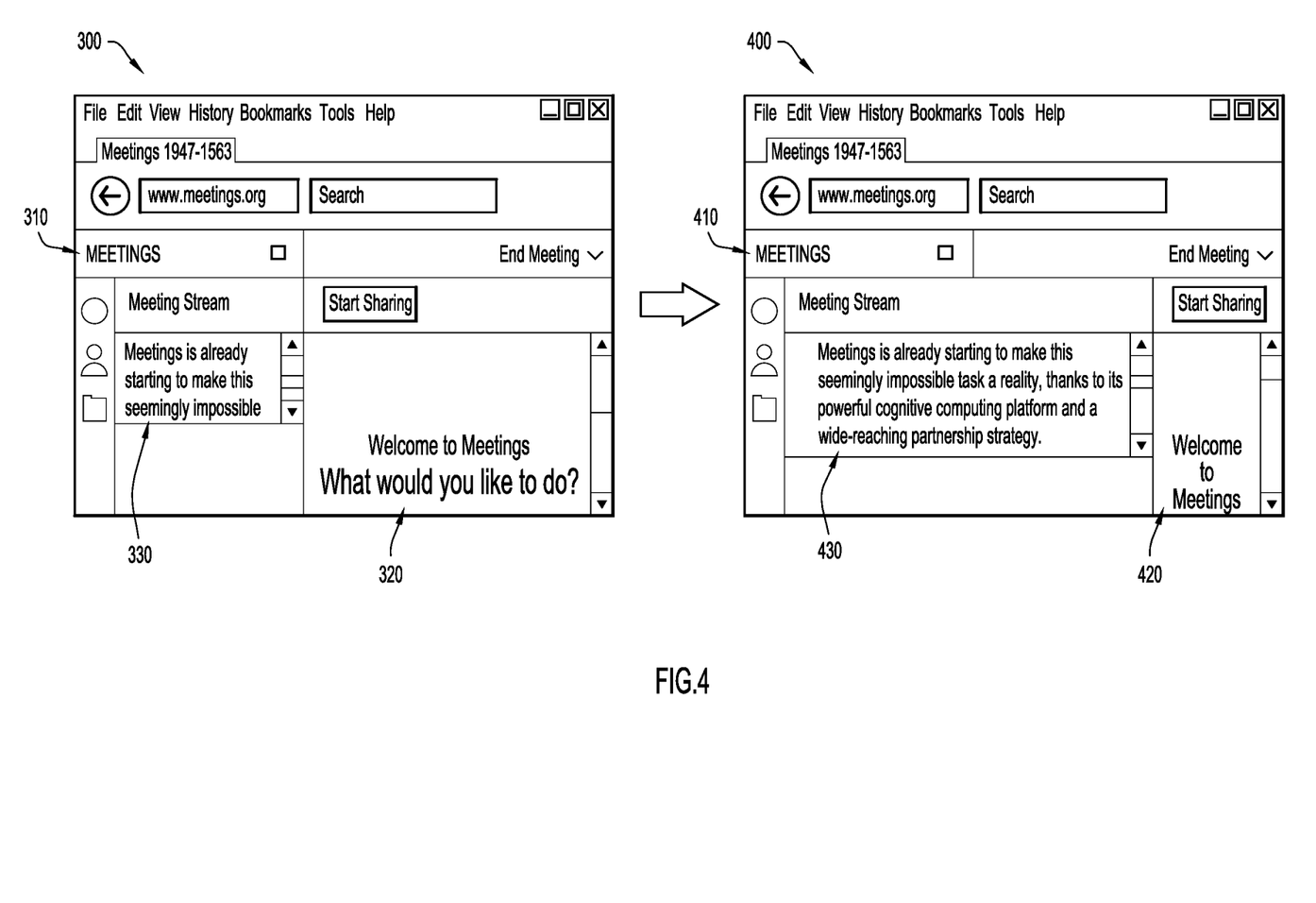
FIG. 4 is a diagrammatic illustration of an example of resizing the active chat room windows of FIG. 3 according to an embodiment of the present invention.

A diagrammatic illustration of a modified application window 400 displayed on user device 110 according to an embodiment of the present invention is illustrated in FIG. 4.

By way of example, modified application window 400 may include application name 410, modified main room area 420 and modified chat room area 430. As discussed above in reference to FIG. 3, user device 110 may initially generate and display application window 300 in accordance with one or more pre-configured parameters. After initially generating and displaying application window 300, user device 110 may detect user activity and/or user focus in chat room area 330 and, in response, resize chat room area 330 based on the detected user activity and/or user focus. For example, as shown in FIG. 4, in response to detecting a user interactively participating in chat room area 330, user device 110 may increase the size of chat room area 330 to that of modified chat room area 430, facilitating user participation in the interactive meeting. User device 110 may further detect little to no user interaction associated with main room area 320, which displays a static greeting, and, in response, decrease the size of main room area 320 to that of modified main room area 420. Thus, user device 110 may increase the size of chat room area 330, which has a high interactive state, while simultaneously decreasing the size of main room area 320, which has a low interactive state, thereby dynamically concentrating the focus of application window 300 to an area of greater user interest and/or activity.

Figure 5:
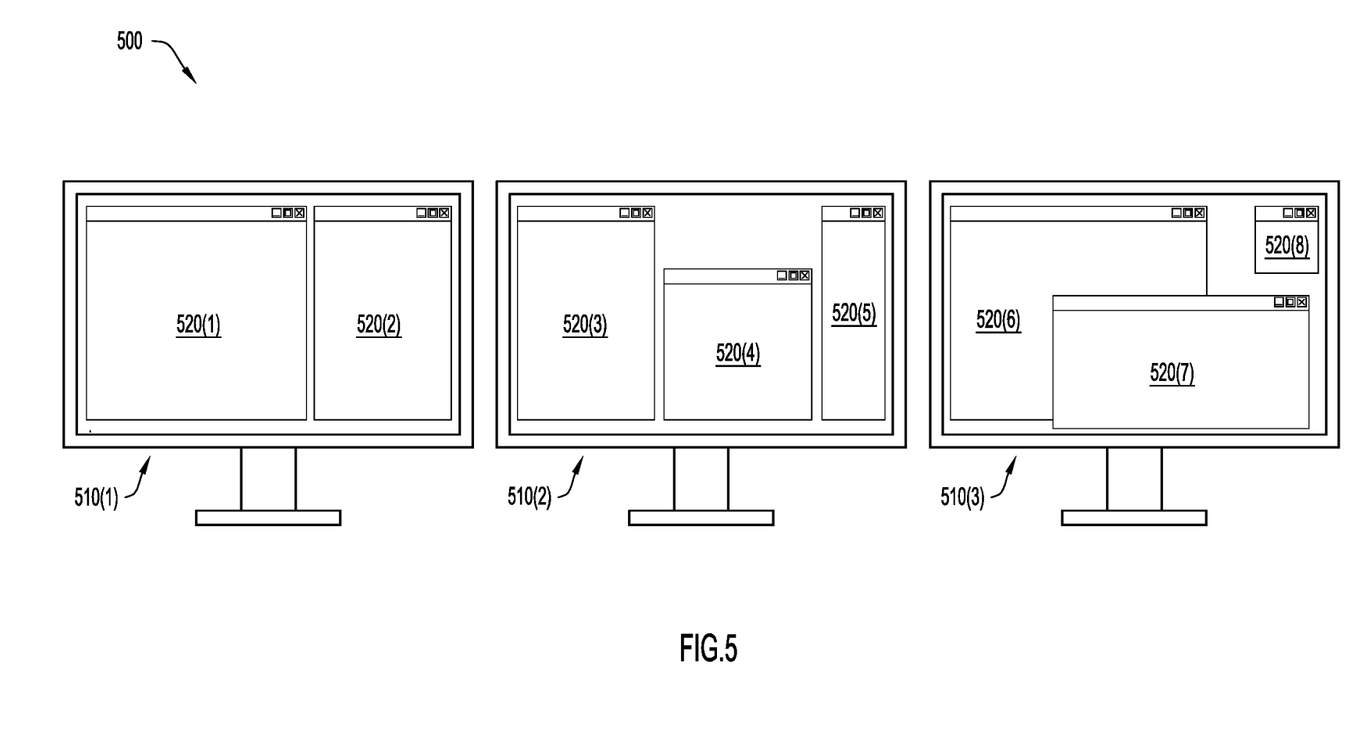
FIG. 5 is a diagrammatic illustration of an example of plural user screens simultaneously displaying multiple application windows.

A diagrammatic illustration of a display environment 500 is illustrated in FIG. 5. By way of example, as shown in FIG. 5, display environment 500 may comprise a plurality of displays, e.g., 510(1), 510(2) and 510(3), associated with one or more user devices 110 such that a plurality of application windows 520 may be rendered on the plurality of displays 510. For example, application windows 520(1) and 520(2) may be rendered on display 510(1), application windows 520(3), 520(4) and 520(5) may be rendered on display 510(2), and application windows 520(6), 520(7) and 520(8) may be rendered on display 510(3). As further shown in FIG. 5, the rendering of application windows 520(1) . . . 520(8) may not be correlated with each other and may not be dynamically sized such that application windows 520(1) . . . 520(8) do not use the entire area of displays 510(1), 510(2) and 510(3). Accordingly, application windows 520(1) . . . . 520(8) are not sized to optimally facilitate user interaction, possibly causing user confusion and frustration.

Figure 6:
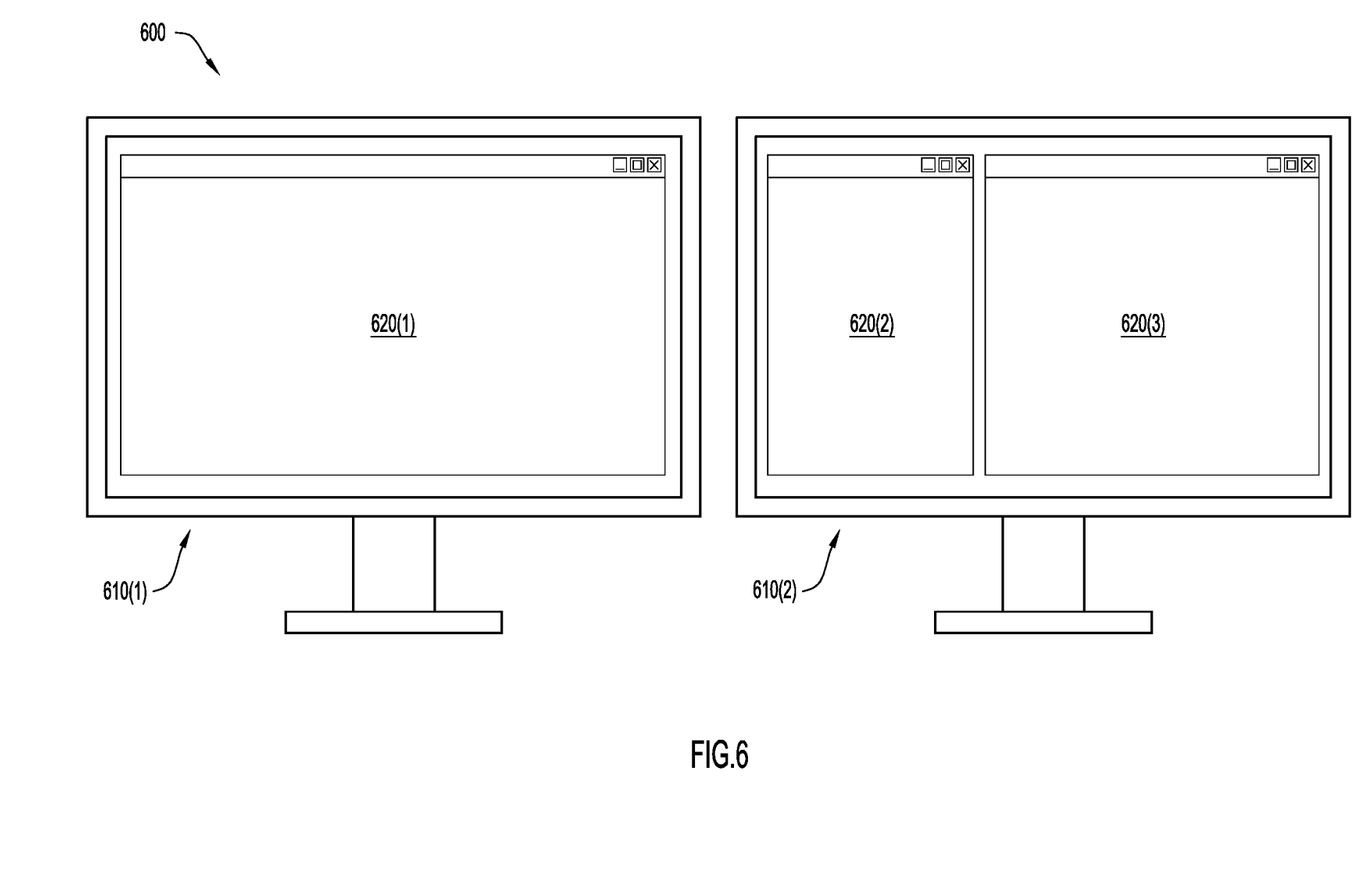
FIG. 6 is a diagrammatic illustration of an example of resizing a plurality of windows displayed on plural screens according to an embodiment of the present invention.

A diagrammatic illustration of a display environment 600 according to an embodiment of the present invention is illustrated in FIG. 6. By way of example, as shown in FIG. 6, display environment 600 may comprise a primary display, e.g., 610(1), and a secondary display, e.g., 610(2), associated with one or more user devices 110 such that a plurality of application windows 620 may be strategically rendered on the primary display, e.g., 610(1), and secondary display, e.g., 610(2). For example, application window 620(1) may be rendered on primary display 610(1), and application windows 620(2) and 620(3) may be rendered on secondary display 610(2). As further shown in FIG. 6, the rendering of application windows 620(1), 620(2) and 620(3) may be correlated with each other and may be dynamically sized such that application windows 620(1), 620(2) and 620(3) efficiently use the entire area of primary display 610(1) and secondary display 610(2). For example, user device 110 may determine that there are two display screens associated with user device 110, e.g., 610(1) and 610(2), as well as the interactive states associated with each of the plurality of application windows, e.g., 620(1), 620(2), 620(3), rendered on the displays. Based on the interactive states associated with each of the plurality of application windows 620(1), 620(2), and 620(3), user device 110 may further determine that application window 620(1) is a primary active window and, in response, increase the size of application window 620(1) to substantially fill the screen area of primary display 610(1). According to a present invention embodiment, a primary application window, e.g., 620(1) may be rendered such that it overlaps or covers one or more inactive application windows simultaneously rendered on a primary display, e.g., 610(1). According to a further present invention embodiment, the size of a primary application window, e.g., 620(1), may be increased such that it "bumps" one or more application windows, e.g., 620(2) and 620(3), from primary display 610(1) to secondary display 610(2).

As discussed above, user device 110 may determine a context associated with an area of user interest and/or focus in a primary application window, e.g., 620(1), and determine one or more application windows that are related and/or correlated with the context of the area of user interest and/or focus. For example, user device 110 may determine that primary application window 610(1) is associated with an intellectual property document management system and further determine that secondary application window 620(2) is a search engine and secondary application window 620(3) comprises a primer on intellectual property. In response, user device 110 may determine that secondary application windows 620(2) and 620(3) are correlated with primary application window 610(1), and may further determine to resize secondary application windows 620(2) and 620(3) such that secondary application windows 620(2) and 620(3) substantially fill the screen area of secondary display 610(2).

According to a present invention embodiment, user device 110 may resize one or more secondary application windows, e.g., 620(2) and 620(3), based on the strength of the correlation between the context of the one or more secondary application windows, e.g., 620(2) and 620(3), and that of a primary application window, e.g., 620(1). For example, user device 110 may determine that secondary application window 620(3) is more strongly correlated with primary application window 620(1) than is secondary application window 620(2). As shown in FIG. 6, therefore, user device 110 may render secondary application windows 620(2) and 620(3) such that the size of secondary application window 620(3) is greater than that of secondary application window 620(2).

Accordingly, as shown in FIG. 6, application windows 620(1), 620(2) and 620(3) may be strategically correlated together and sized to optimally facilitate user interaction with both primary application window 620(1) as well as secondary application windows 620(2) and 620(3).

Figure 7:
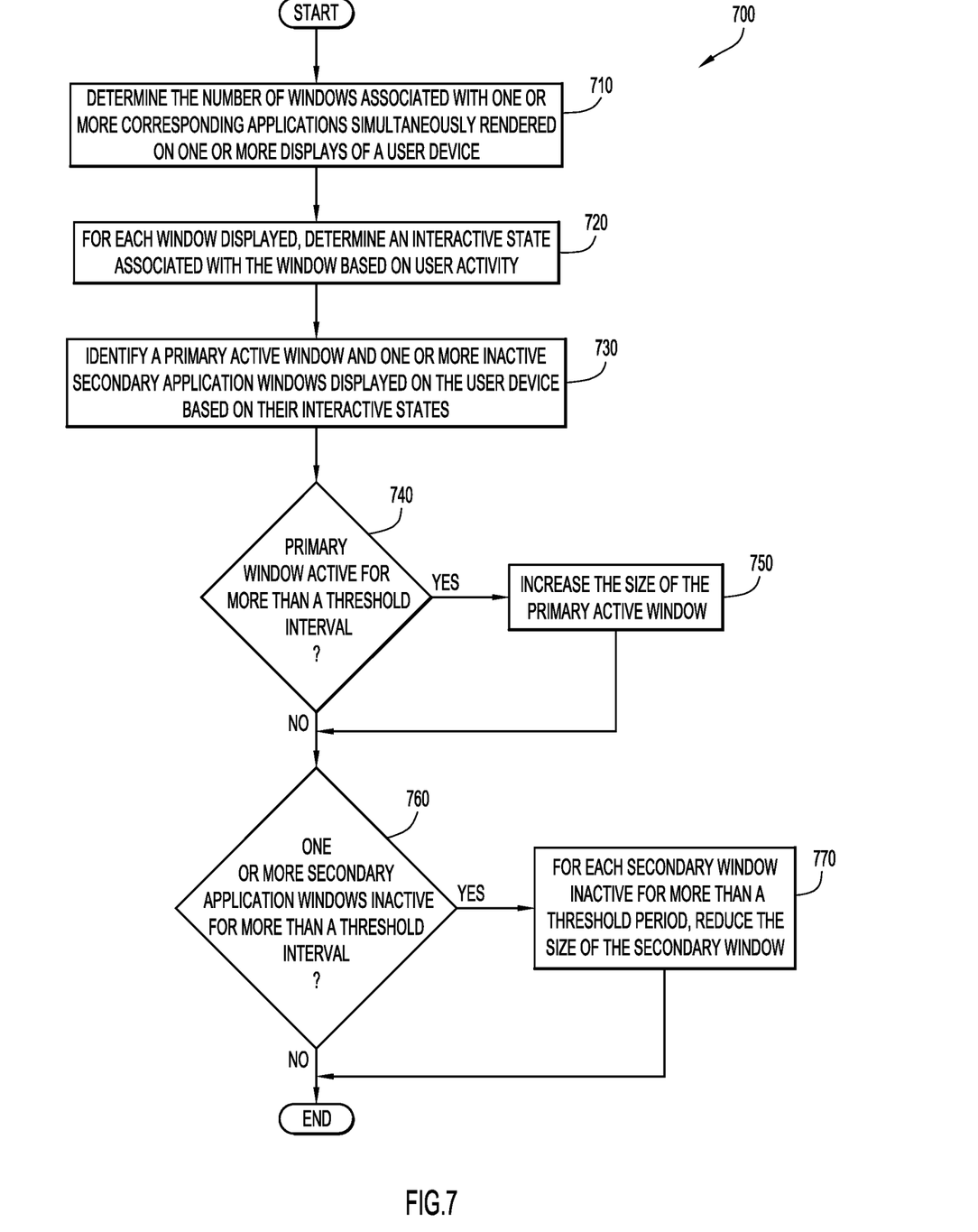
FIG. 7 is a procedural flow chart illustrating a manner in which one or more application windows are resized based on one or more interactive states according to an embodiment of the present invention.

With reference to FIG. 7, there is depicted a procedural flow chart illustrating a method 700 in which a primary application window and one or more secondary application windows are dynamically resized based on an interactive status associated with each of the application windows. Method 700 is performed primarily by application window manager 230.

In accordance with process 700, user profile database 270 may be preconfigured with one or more parameters and/or user preferences associated with the rendering of one or more application windows on one or more displays 120. Initially, display handler 240 may determine the number of application windows being simultaneously rendered on one or more displays 120 associated with user device 110 at step 710.

For each application window rendered on one or more displays 120, activity sensor module 250 may analyze one or more user activities within each application window to determine an interactive state associated with each application window at step 720. For example, activity sensor module 250 may determine an interactive state associated with an application window based on the number of user clicks occurring within the application window.

Based on the interactive states associated with each application window, application window manager 230 may determine a primary application window and one or more secondary application windows at step 730. For example, application window manager 230 may determine a primary application window based on recent and/or high level user activity occurring within the application window.

If application window manager 230 determines that a user has been currently interacting with the primary application window, e.g., by clicking a link and/or a segment in the primary application window, for more than a pre-configured threshold interval of time at step 740, application window manager 230 may increase the size of the primary active window at step 750. According to a present invention embodiment, application window manager 230 may gradually increase the size of the primary application window until the size of the primary application window reaches a default maximum value.

If application window manager 230 further determines that a user has not interacted with one or more secondary application windows for more than a pre-configured threshold interval of time at step 760, application window manager 230 may decrease the size of the one or more secondary application windows at step 770 and method 700 ends. According to a present invention embodiment, application window manager 230 may gradually decrease the size of one or more secondary application windows until the size of the one or more secondary application windows reaches a default minimum value.

Figure 8:
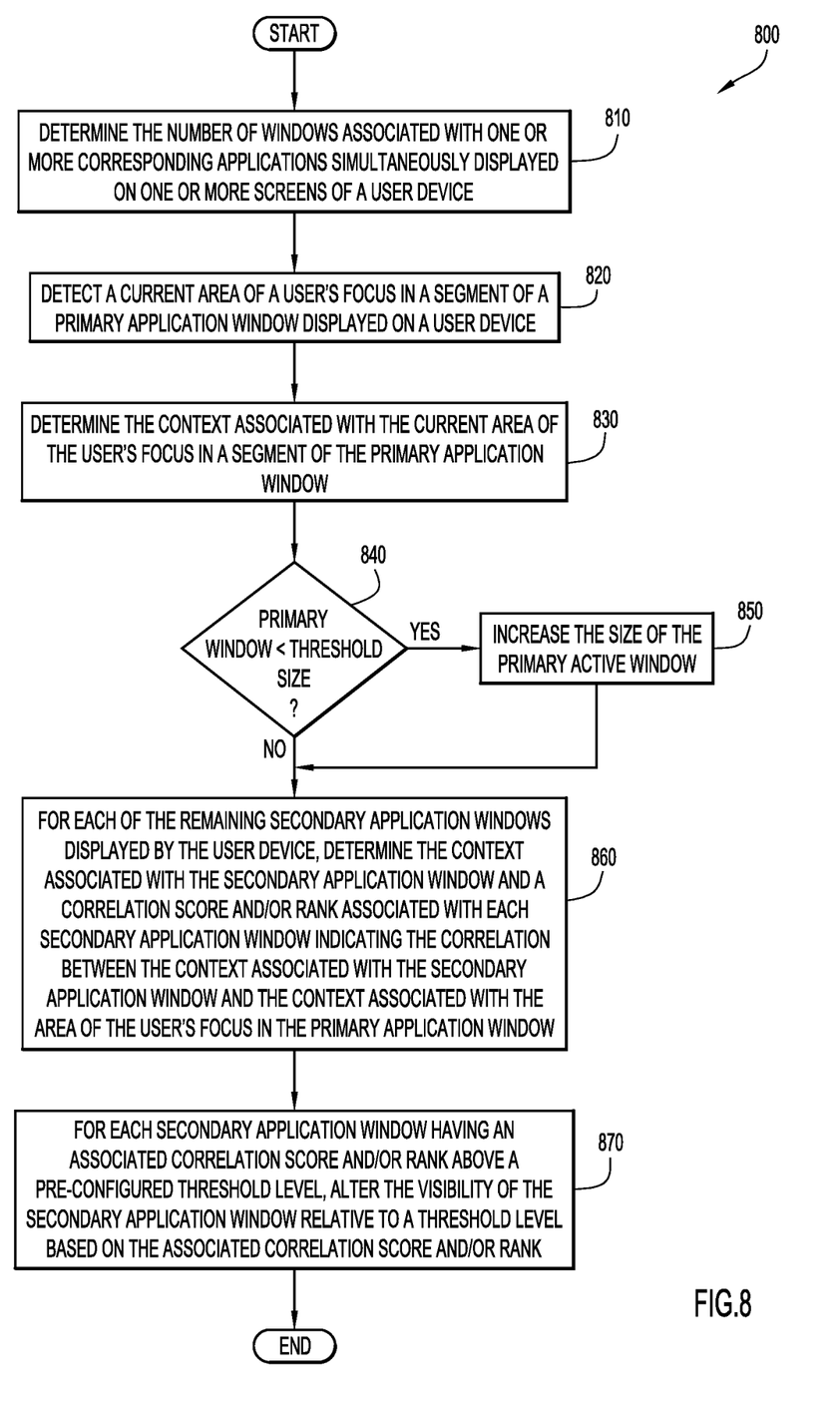
FIG. 8 is a procedural flow chart illustrating a manner in which one or more application windows are resized based on a context associated with the one or more application windows according to an embodiment of the present invention.

With reference to FIG. 8, there is depicted a procedural flow chart illustrating a method 800 in which a primary application window is dynamically resized and the visibility of one or more secondary application windows is modified based on an interactive status associated with each of the application windows. Method 800 is performed primarily by application window manager 230.

In accordance with process 800, user profile database 270 may be preconfigured with one or more parameters and/or user preferences associated with the rendering of one or more application windows on one or more displays 120. Initially, display handler 240 may determine the number of application windows being simultaneously rendered on one or more displays 120 associated with user device 110 at step 810.

Activity sensor module 250 may analyze one or more user activities within each application window to determine a current area of a user's interest or focus in a segment of an application window at step 820. For example, activity sensor module 250 may determine a user's current area of area or focus by following a user's eye movements (e.g., via image processing of user images from image capture device 160) as the user is reading a section of a primary application window, e.g., a chat room.

Based on the current area of the user's interest or focus occurring within the primary application window, context analyzer manager 260 may, e.g., by using NLP techniques, determine the context associated with the current area of the user's interest or focus at step 830. For example, if context analyzer manager 260 determines that a title associated with the current area of the user's interest or focus is "meetings," context analyzer manager 260 may determine that the context associated with the current area of the user's interest or focus is a streaming chat room conversation in which the user is participating.

If application window manager 230 determines the size of the primary application window is less than a threshold level at step 840, application window manager 230 may increase the size of the primary active window at step 850. For example, activity sensor module 250 may, using image capture device 160, follow a user's eye movements as the user is reading a section of a chat room to determine that the user is approaching the bottom of the text view in the chat room, and, in response, expand or maximize the chat room window to reduce or eliminate the user's need to scroll down. According to a present invention embodiment, application window manager 230 may gradually increase the size of the primary application window until the size of the primary application window reaches a default maximum value.

For each of the remaining secondary application windows displayed by the user device, application window manager 230 may determine the context associated with each secondary application window and a correlation score and/or rank associated with the secondary application window indicating the correlation between the context associated with the secondary application window and the context associated with the area of the user's focus in the primary application window at step 860. It should be understood that application window manager 230 may use any known, or later developed, method and/or technique to determine a correlation score and/or rank associated with the secondary application window (e.g., distance metrics, feature vectors, dimensionality reduction, Euclidean distance, cosine distance, sorting sentential contexts, Ordinary Least Squares, etc.).

For each secondary application window having an associated correlation score and/or rank above a pre-configured threshold level, application window manager 230 may alter or modify the visibility of the secondary application window relative to a threshold level based on the associated correlation score and/or rank at step 870 and process 800 ends. For example, application window manager may, based on the associated correlation scores and/or ranks relative to the threshold level, minimize one or more application windows that are inactive and/or not currently in use, dim the visibility associated with one or more active application windows that are not a primary area of user interest, and/or enlarge one or more application windows that contain an area of user interest.

Figure 9:
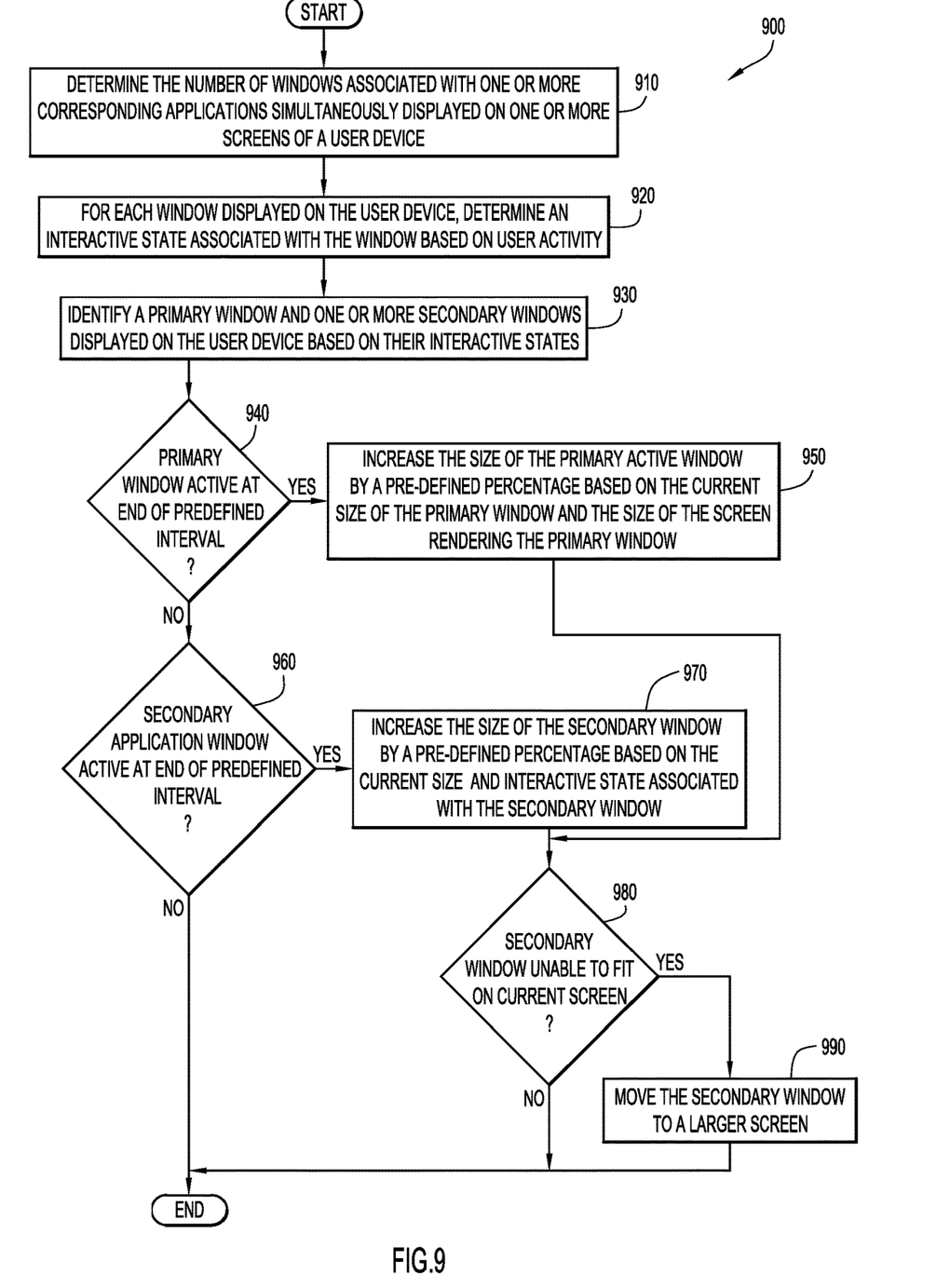
FIG. 9 is a procedural flow chart illustrating a manner in which one or more application windows are resized by pre-defined percentages based on an interactive state and/or one or more screens associated with a user device according to an embodiment of the present invention.

With reference to FIG. 9, there is depicted a procedural flow chart illustrating a method 900 in which the sizes of a primary application window and one or more secondary application windows are dynamically increased by a predefined percentage based on an interactive status associated with each of the application windows. Method 900 is performed primarily by application window manager 230.

In accordance with process 900, user profile database 270 may be preconfigured with one or more parameters and/or user preferences associated with the rendering of one or more application windows on one or more displays 120. Initially, display handler 240 may determine the number of application windows being simultaneously rendered on one or more displays 120 associated with user device 110 at step 910.

For each application window rendered on one or more displays 120, activity sensor module 250 may analyze one or more user activities within each application window to determine an interactive state associated with each application window at step 920. For example, activity sensor module 250 may determine an interactive state associated with an application window based on user clicks, one or more scene changes occurring within the application window, presentation slides being changed in a web conference, etc.

Based on the interactive states associated with each application window, application window manager 230 may determine a primary application window and one or more secondary application windows at step 930. For example, application window manager 230 may determine a primary application window based on a user reading emails in an email application window.

If application window manager 230 determines that the primary application window is currently active at the end of a predefined interval at step 940, application window manager 230 may increase the size of the primary active window by a pre-defined percentage based on the current size of the primary application window and the size of display 120 rendering the primary window at step 950.

If application window manager 230 determines that a secondary application window is currently active at the end of the predefined interval at step 960, application window manager 230 may increase the size of the secondary application window by a pre-defined percentage based on the current size and interactive state associated with the secondary application window at step 970. For example, application window manager 230 may automatically expand or zoom into an application window displaying a web conference that a user is attending whenever a presenter in the web conference switches slides, enabling the user to read the slides without manually changing dimensions of the application window.

If application manager 230 determines that the increased primary or secondary application window is unable to fit on display 120 at step 980, application manager 230 may move, either temporarily or permanently, the primary and/or secondary window to a larger display 120 at step 990 and method 900 ends. For example, as a web conference application window becomes active, application manager 230 may move the web conference application window to the largest display 120 associated with user device 110. According to a present invention embodiment, application manager 230 may fade in a secondary application window when application manager 230 moves the secondary application window to a different display 120.

Accordingly, present embodiments may dynamically alter an application window's size seamlessly on one or more monitors. Present embodiments may further minimize or dim the visibility of one or more inactive application windows to allow a user to focus on only those application windows having an area of interest to the user.

It will be appreciated that the embodiments described above and illustrated in the drawings represent only a few of the many ways of implementing embodiments for dynamically resizing one or more application windows based on an interactive state associated with the one or more application windows.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.).

The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., application window manager, display handler, activity sensor module, context analyzer module, etc.). These systems may include any types of monitors and input devices (e.g., keyboard, mouse, voice recognition, etc.) to enter and/or view information.

It is to be understood that the software (e.g., application window manager, display handler, activity sensor module, context analyzer module, etc.) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., application window manager, display handler, activity sensor module, context analyzer module, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store one or more parameters or configuration data associated with dynamically resizing one or more application windows. The database system may be implemented by any number of any conventional or other databases, data stores or storage structures (e.g., files, databases, data structures, data or other repositories, etc.) to store information (e.g., user device configuration settings, screen sizes, security preferences, etc.). The database system may be included within or coupled to the server and/or client systems. The database systems and/or storage structures may be remote from or local to the computer or other processing systems, and may store any desired data (e.g., user device configuration settings, screen size, security preferences, etc.).

The present invention embodiments may employ any number of any type of user interface (e.g., Graphical User Interface (GUI), command-line, prompt, etc.) for obtaining or providing information (e.g., window configurations, user or other preferences, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion. The report may include any information arranged in any fashion, and may be configurable based on rules or other criteria to provide desired information to a user (e.g., user device configuration settings, screen sizes, security preferences, etc.).

The present invention embodiments are not limited to the specific tasks or algorithms described above, but may be utilized for any type of application window (e.g., personal, business, legal, financial, etc.) to perform any type of dynamic window resizing on any device (e.g., camera, smartphone, server, etc.).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of dynamically controlling windows on a display comprising:
   displaying a plurality of different windows associated with one or more corresponding applications;
   determining an interactive state of each of the plurality of different windows, wherein the interactive state indicates one of an active window and an inactive window based on occurrence of user activities within a corresponding window;
   determining a correlation score for one or more windows of the plurality of different windows indicating a correlation with an area of user interest of an active window; and
   adjusting a size of the one or more windows relative to other windows within the plurality of different windows automatically in accordance with the correlation score to visually distinguish the one or more windows, wherein the adjusted one or more windows are displayed with the other windows.

2. The method of claim 1, wherein the interactive state includes an amount of activity over a time interval within a corresponding window, and adjusting a size comprises:
   enlarging a size of the active window with a greater amount of activity relative to other windows within the plurality of different windows.

3. The method of claim 1, wherein the interactive state includes the area of user interest within the plurality of different windows, and adjusting a size comprises:
   enlarging a size of the active window providing the area of user interest relative to other windows within the plurality of different windows.

4. The method of claim 1, wherein adjusting a size comprises:
   adjusting appearance of non-interested areas of a user by dimming the non-interested areas.

5. The method of claim 1, wherein at least one of the plurality of different windows is displayed on a first display device, and adjusting a size comprises:
   transferring at least one adjusted window from the first display device for presentation on a second display device.

6. The method of claim 1, wherein adjusting a size comprises:
   adjusting a size of one or more of the plurality of different windows based on scene changes within a window.

7. The method of claim 1, wherein adjusting a size comprises:
   adjusting a size of one or more of the plurality of different windows across a plurality of display devices in accordance with the determined interactive state.

8. A system for dynamically controlling window sizes comprising:
   one or more display devices configured to display a plurality of windows associated with one or more corresponding applications; and
   at least one processor configured to:
      display the plurality of different windows associated with the one or more corresponding applications;
      determine an interactive state of each of the plurality of different windows, wherein the interactive state indicates one of an active window and an inactive window based on occurrence of user activities within a corresponding window;
      determine a correlation score for one or more windows of the plurality of different windows indicating a correlation with an area of user interest of an active window; and adjust a size of the one or more windows relative to other windows within the plurality of different windows automatically in accordance with the correlation score to visually distinguish the one or more windows, wherein the adjusted one or more windows are displayed with the other windows.

9. The system of claim 8, wherein the interactive state includes an amount of activity over a time interval within a corresponding window, and adjusting a size comprises:
enlarging a size of the active window with a greater amount of activity relative to other windows within the plurality of different windows.

10. The system of claim 8, wherein the interactive state includes the area of user interest within the plurality of different windows, and adjusting a size comprises:
enlarging a size of the active window providing the area of user interest relative to other windows within the plurality of different windows.

11. The system of claim 8, wherein adjusting a size comprises:
adjusting appearance of non-interested areas of a user by dimming the non-interested areas.

12. The system of claim 8, wherein at least one of the plurality of different windows is displayed on a first display device, and adjusting a size comprises:
transferring at least one adjusted window from the first display device for presentation on a second display device.

13. The system of claim 8, wherein adjusting a size comprises:
adjusting a size of one or more of the plurality of different windows based on scene changes within a window.

14. The system of claim 8, wherein adjusting a size comprises:
adjusting a size of one or more of the plurality of different windows across a plurality of display devices in accordance with the determined interactive state.

15. A computer program product for dynamically controlling window sizes comprising:
one or more computer readable storage media collectively having program instructions embodied therewith, the program instructions executable by at least one processor to cause the at least one processor to:
display a plurality of different windows associated with one or more corresponding applications;
determine an interactive state of each of the plurality of different windows, wherein the interactive state indicates one of an active window and an inactive window based on occurrence of user activities within a corresponding window;
determine a correlation score for one or more windows of the plurality of different windows indicating a correlation with an area of user interest of an active window; and
adjust a size of the one or more windows relative to other windows within the plurality of different windows automatically in accordance with the correlation score to visually distinguish the one or more windows, wherein the adjusted one or more windows are displayed with the other windows.

16. The computer program product of claim 15, wherein the interactive state includes an amount of activity over a time interval within a corresponding window, and adjusting a size comprises:
enlarging a size of the active window with a greater amount of activity relative to other windows within the plurality of different windows.

17. The computer program product of claim 15, wherein the interactive state includes the area of user interest within the plurality of different windows, and adjusting a size comprises:
enlarging a size of the active window providing the area of user interest relative to other windows within the plurality of different windows.

18. The computer program product of claim 15, wherein adjusting a size comprises:
adjusting appearance of non-interested areas of a user by dimming the non-interested areas.

19. The computer program product of claim 15, wherein at least one of the plurality of different windows is displayed on a first display device, and adjusting a size comprises:
transferring at least one adjusted window from the first display device for presentation on a second display device.

20. The computer program product of claim 15, wherein adjusting a size comprises:
adjusting a size of one or more of the plurality of different windows based on scene changes within a window.

* * * * *